United States Patent
Peddemors et al.

(10) Patent No.: US 10,264,001 B2
(45) Date of Patent: Apr. 16, 2019

(54) METHOD AND SYSTEM FOR NETWORK RESOURCE ATTACK DETECTION USING A CLIENT IDENTIFIER

(71) Applicant: Wizard Tower TechnoServices Ltd., Vancouver (CA)

(72) Inventors: Michael Peddemors, Vancouver (CA); William Storey, Vancouver (CA)

(73) Assignee: Wizard Tower TechnoServices Ltd., Vancouver (CA)

( * ) Notice: Subject to any disclaimer, the term of this patent is extended or adjusted under 35 U.S.C. 154(b) by 244 days.

(21) Appl. No.: 15/235,905

(22) Filed: Aug. 12, 2016

(65) Prior Publication Data

US 2017/0048260 A1   Feb. 16, 2017

Related U.S. Application Data

(60) Provisional application No. 62/204,293, filed on Aug. 12, 2015.

(51) Int. Cl.
| | | |
|---|---|---|
| H04L 29/06 | (2006.01) | |
| H04W 12/04 | (2009.01) | |
| H04W 12/06 | (2009.01) | |

(52) U.S. Cl.
CPC ......... *H04L 63/1416* (2013.01); *H04L 63/06* (2013.01); *H04L 63/0853* (2013.01); *H04L 63/0876* (2013.01); *H04L 63/1458* (2013.01); *H04W 12/04* (2013.01); *H04W 12/06* (2013.01)

(58) Field of Classification Search
CPC . H04L 63/06; H04L 63/1416; H04L 63/0876; H04L 63/0853; H04L 63/1458; H04W 12/06; H04W 12/08; H04W 12/04
USPC .......................................................... 726/7, 25
See application file for complete search history.

(56) References Cited

U.S. PATENT DOCUMENTS

| | | | | |
|---|---|---|---|---|
| 6,771,751 | B1 * | 8/2004 | Kasturi | H04L 12/66 341/173 |
| 6,892,307 | B1 * | 5/2005 | Wood | G06F 21/41 713/155 |
| 6,971,005 | B1 * | 11/2005 | Henry | H04L 63/0815 713/155 |
| 7,266,693 | B1 * | 9/2007 | Potter | H04L 9/3226 382/249 |
| 7,308,261 | B2 * | 12/2007 | Henderson | H04L 51/04 455/410 |

(Continued)

OTHER PUBLICATIONS

"Basic DNS: PTR records and why you care"; blog post; http://aplawrence.com/Blog/B961.html; Sep. 27, 2015; 14 pages.

*Primary Examiner* — Syed A Zaidi
(74) *Attorney, Agent, or Firm* — Klarquist Sparkman, LLP

(57) ABSTRACT

Methods, systems, and techniques for network resource attack detection using a client identifier. A server receives from a device the client identifier and user credentials. The client identifier and user credentials are assessed to determine their authenticity. If one or both of the credentials and identifier are inauthentic, the device does not learn from the server which of the identifier and credentials have been found to be inauthentic. When at least one of the identifier and credentials are inauthentic, the device that sent them is assessed to determine whether it is an attacker of the network resource. If the device is determined to be an attacker, one or both of prophylactic and remedial action is taken in response.

20 Claims, 4 Drawing Sheets

(56) References Cited

U.S. PATENT DOCUMENTS

| | | | |
|---|---|---|---|
| 8,370,933 B1* | 2/2013 | Buckler | H04L 63/14 709/223 |
| 8,606,234 B2* | 12/2013 | Pei | G06F 21/42 455/410 |
| 9,060,017 B2* | 6/2015 | Marion | G06F 21/55 |
| 2003/0046577 A1* | 3/2003 | Silverman | H04L 41/12 726/23 |
| 2003/0065940 A1* | 4/2003 | Brezak | H04L 63/0815 726/4 |
| 2005/0216955 A1* | 9/2005 | Wilkins | H04L 63/083 726/23 |
| 2006/0185021 A1* | 8/2006 | Dujari | H04L 63/08 726/27 |
| 2013/0117826 A1* | 5/2013 | Gordon | G06F 21/31 726/5 |
| 2013/0318572 A1* | 11/2013 | Singh | H04W 12/08 726/4 |
| 2015/0089568 A1* | 3/2015 | Sprague | H04L 63/0876 726/1 |
| 2015/0310201 A1* | 10/2015 | Sugiyama | H04W 12/12 726/7 |

* cited by examiner

METHOD AND SYSTEM FOR NETWORK RESOURCE ATTACK DETECTION USING A CLIENT IDENTIFIER

TECHNICAL FIELD

The present disclosure is directed at methods, systems, and techniques for network resource attack detection using a client identifier.

BACKGROUND

A "network resource" refers generally to a computing resource that is accessible via a network connection. An example type of network resource is a mail server accessible using a protocol such as the Simple Mail Transfer Protocol ("SMTP") or the Internet Message Access Protocol ("IMAP"). A "network resource attack" refers generally to any malicious attempt to compromise security or operation of a network resource. Example types of network resource attacks are "dictionary" and "brute force" attacks, each of which attempts to determine the authentication credentials of a network resource by repeatedly trying to access that resource using different guesses of those credentials.

Regardless of the particular type of network resource or network resource attack, problems related to facilitating network security remain important, and are arguably increasing in importance, in an increasingly network connected world.

SUMMARY

According to a first aspect, there is provided a method for network resource attack detection using a client identifier. The method comprises receiving, at a server, the client identifier and user credentials from a device; determining whether the client identifier and user credentials are authentic, wherein the device does not learn from the server which of the client identifier and user credentials are inauthentic when one or both of the client identifier and user credentials are determined to be inauthentic; when at least one of the client identifier and user credentials are inauthentic, determining whether the device is an attacker of the network resource; and performing one or both of prophylactic and remedial action in response to determining that the device is an attacker.

The client identifier may be representative of a class of devices (e.g., all Apple™ iOS™ devices, based on a software product key of the iOS™ operating system, which is found only on iOS™ devices) or a specific device (e.g., a MAC address that is unique to a device).

The client identifier may be representative of a class of users (e.g., all users having a birthday on a certain date) or a specific user (e.g., a digital representation of a user's biometric identifier).

The client identifier may be selected from the group comprising a MAC address of the device; a software license identifier; information stored on a SIM card inserted in the device; a serial number of the device; a car vehicle identification number; a hardware encryption key; a version of software; a personal identification number; a digital representation of a biometric identifier of the user; and a birthday of the user.

The action may be selected from the group comprising contacting authorities; adding the IP address of the device to a blacklist; banning or restricting access of the client identifier; banning or restricting access of the user credentials; refusing connections or logins from any one or more of the IP address, rDNS/PTR, and geographical location of the device; creating a database of methods used by the device to connect to the server; publishing data regarding the connection from the device, stealth banning the device; and tarpitting the device.

According to another aspect, there is provided a non-transitory computer readable medium having computer program code stored thereon to cause a processor to perform a method for network resource attack detection as described above.

According to another aspect, there is provided a system for network attack detection using a client identifier. The system comprises a server that comprises ports for communication with devices such as clients and attackers, a processor, and a non-transitory computer readable medium having computer program code stored thereon to cause a processor to perform a method for network resource attack detection as described above.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
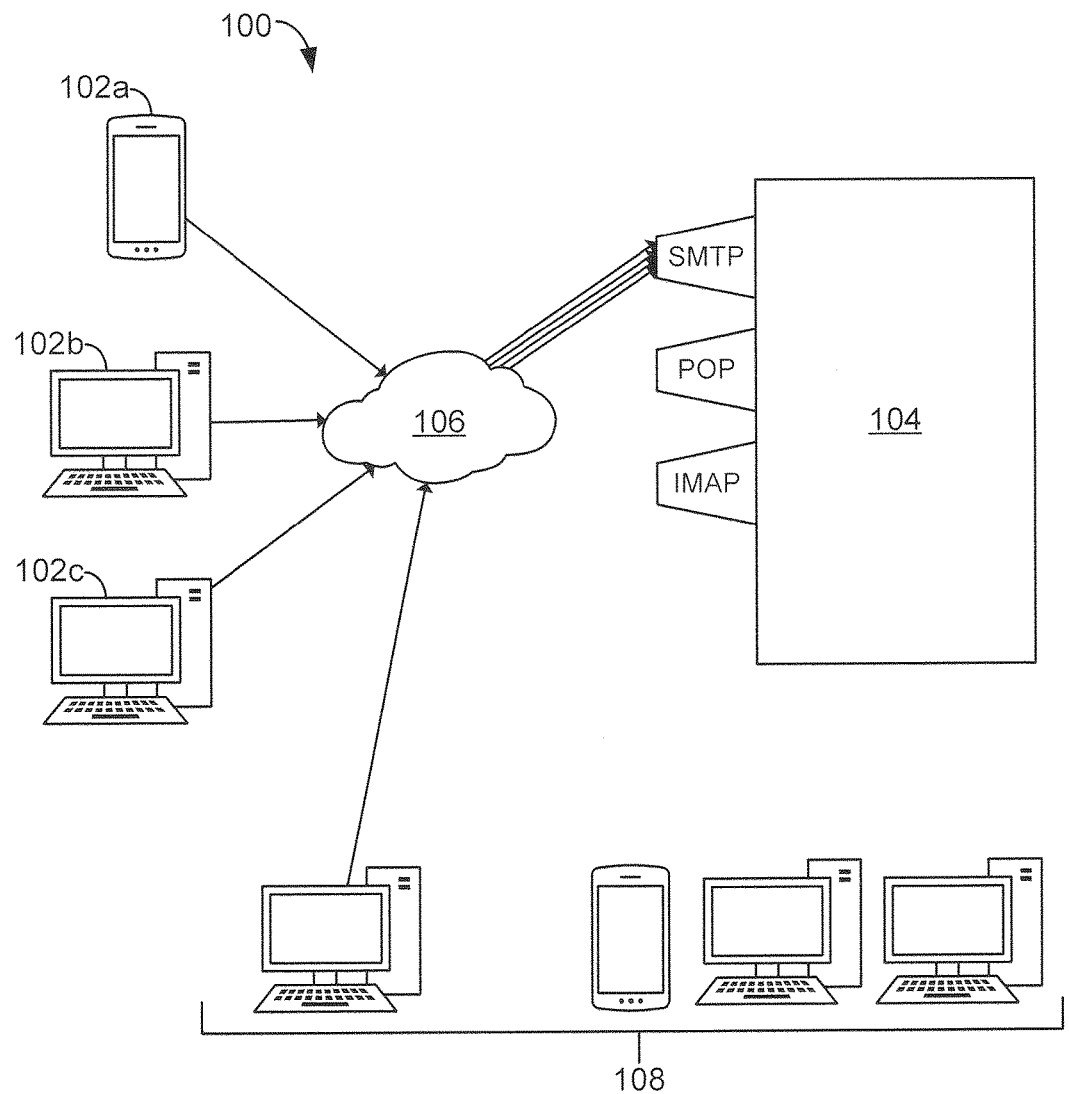
FIG. 1 is a system for network resource attack detection using a client identifier, according to a first embodiment.

Different protocols may be used to connect to different network services. For example, when the network service comprises a mail transfer agent (hereinafter interchangeably referred to as a "mail server"), a client may use a conventional protocol such as SMTP or IMAP to send messages to and receive messages from the mail server. While the mail server may be able to determine any one or more of the location of the client (e.g., via IP address), the client's credentials (e.g., a username/e-mail address and password using SMTP AUTH, RFC 2554), and security layers (RFC 4954), being able to identify these characteristics alone has been relatively ineffective in preventing network resource attacks, such as dictionary and brute force attacks. For example, rate limiting, which limits the rate at which an attacker may launch network resource attacks, also prejudices an authentic user's ability to access the network resource and delays, but does not eliminate, the ability of an attacker to infiltrate the resource. Similarly, using location determination to determine whether to grant access to the network resource may prejudice an authentic user (e.g., if the authentic user is traveling and accessing the resource from an unexpected location) and may be bypassed by an attacker (e.g., by using a virtual private network).

The embodiments described herein are directed at presenting a client identifier ("CID") as part of one or more of methods, systems, and techniques to authenticate a client and to determine what level of access to grant to the client depending on whether the CID presented by the client to the network resource is verified/authenticated by, for example, the network resource or a trusted third party. In combination with whether the CID is verified, in some embodiments the network resource may perform additional actions to determine whether it is being attacked. For example, the network resource may determine one or both of the characteristics of the device that is connecting or attempting to connect to the network resource and the characteristics of the connection footprint. Additionally or alternatively, the network resource may determine whether that device is being used to perform a method, either alone or together with other devices, that is outside of the expected behavior the network resource expects to see from clients. When the network resource determines that an attack is occurring, it can take appropriate action, such as any one or more of notifying the holder of the accounts under attack that an attack has occurred, notifying network operators of the source (e.g., IP address) of the attack, blacklisting the IP address from which the attack originated, and notifying security or law enforcement officials of the attack.

In the following example embodiments, a mail server is used as an example of the network resource and the client may comprise, for example, a personal computer or mobile device such as a smartphone. In different embodiments (not depicted), however, the network resource may be something other than or in addition to the mail server (e.g., a web or file server) and the client may be something other than or in addition to the personal computer or smartphone (e.g., another server). Additionally, while SMTP and IMAP are used as the communications protocol in the following examples, in different embodiments (not depicted), different communications protocols (e.g., POP, HTML) may be used.

An excerpt from a log file of a conventional SMTP session between a client ("C") and mail server ("S") is shown below, in which the client is attempting to attack the mail server:

Trying 10.10.1.1.
1 C: [connection established]
2 S: 220 server.example.com ESMTP ready
3 C: EHLO client.example.net
4 S: 250-server.example.com
S: 250-STARTTLS
6 C: STARTTLS
7 S: 220 Go ahead
8 C: <starts TLS negotiation>
9 C & S: <negotiate a TLS session>
10 C & S: <check result of negotiation>
11 C: EHLO client.example.net
12 S: 250-server.example.com
13 S: 250-AUTH PLAIN
14 C: AUTH PLAIN dGVzdABOZXNOADEyMzQ=
S: 235 2.7.0 Authentication successful
16 C: MAIL FROM:<sender@example.net>
17 S: 250 OK
18 C: RCPT TO:<receiver@example.com>
19 S: 250 OK In this example, the server is located at IP 10.10.1.1. A connection between the client and server is established (line 1) and the server notifies the client that it is ready for communication (line 2). The client greets the server using EHLO (line 3), indicating that the Extended SMTP protocol is in use, and the server responds (line 4). The client and server then negotiate a Transport Layer Security ("TLS") session (lines 5 to 10) for subsequent encrypted plaintext communication. Using the encryption that the TLS session affords, the client issues another EHLO command (line 11) following which the server advertises that it supports SMTP Authorization ("AUTH") (lines 12 and 13). The client presents a hashed version of a user's authorization credentials (line 14), which in this case are the user's username (e.g., e-mail address) and password, following which the server responds that the user exists, the password is correct, and access can be granted based on the credentials provided (line 15). Mail is subsequently transferred from the client to the server (lines 16 to 19).

In this example following establishment of the TLS session, the server has access to information such as the client's IP address, the geographical location corresponding to the client's IP address, certain limited information regarding the type of operating system used by the client, the reverse DNS of the IP address (rDNS/PTR), the host identifier of the operating system (hostname via HELO), and the registrant of the client's IP address (via ARIN/whois). However, the server does not understand whether the client is approved to use any of the information it has presented, such as the hashed authorization credentials. Furthermore, the server is typically configured to positively or negatively respond to the client depending on whether the client has presented correct or incorrect authorization credentials; line 15 above shows the server's positive response, while an example of a negative response is "authentication failed". This provides an attacker with information regarding whether it has successfully compromised a user's account. In the example where the authorization credentials are a username and password, an attacker is able to repeatedly present different username and password combinations to the server (e.g., by using a dictionary or brute force attack) until it receives a positive response to the AUTH command. If the attacker is able to determine at least one of the username and password (e.g., by using a keystroke logger or sniffing), it can be easier to successfully gain access to the account associated with those credentials. As discussed above, solutions such as rate limiting and using location as a filter for connection requests have their shortcomings. Generally, in conventional systems, actions taken by an attacker to attack a network resource using dictionary or brute force methods overlap with actions that a legitimate user may also take; for example, both a legitimate user who is traveling and an attacker may attempt to login to the network resource from an unfamiliar IP address, and a legitimate user who has forgotten his or her password and an attacker may attempt to login repeatedly using an incorrect password. As described herein, the CID provides a way for the network resource to distinguish between a legitimate user and an attacker.

Referring now to FIG. 1, there is shown an example of a system 100 for network resource attack detection using a CID, according to a first embodiment. The system 100 comprises a network resource in the form of a mail server 104; however, as discussed above, in different embodiments the network resource may be a different type of resource, such as a web server. The server 104 is depicted as having three ports (depicted but not numerically labeled in FIG. 1) that can be used to exchange mail: an SMTP port, a POP port, and an IMAP port. In FIG. 1, three clients 102*a-c* (generally, "clients 102") are communicatively coupled to the SMTP port via a network 106, with the clients 102 and the network 106 comprising part of the system 100. The network 106 may be any suitable network for facilitating communication between the clients 102 and the server 104, such as the Internet or another packet switched wide area or local area network.

Also shown in FIG. 1 are multiple attackers 108. One of the attackers 108 is using a computer terminal, similar to the clients 102 used by authentic users, to communicate with the server's 104 SMTP port. The goal of this attacker 108 is to use a dictionary or brute force attack to gain access to at least one of the authentic users' mail accounts.

As illustrated in the following examples, the clients 102 and server 104 of FIG. 1 implement an SMTP-based protocol that incorporates the CID to reduce the likelihood that any of the attackers 108 will be able to access any of the clients' 102 mail accounts.

Example 1

In contrast to the log file of a conventional SMTP session reproduced above, the following is an excerpt from a log file of an SMTP session between one of the clients 102 ("C") and the server 104 ("S"), according to one embodiment:

1 C: [connection established]
2 S: 220 server.example.com ESMTP ready
3 C: EHLO mycelphone
4 S: 250-server.example.com
 S: 250-CID
6 S: 250-STARTTLS
7 C: STARTTLS
8 S: 220 Go ahead
9 C: <starts TLS negotiation>
10 C & S: <negotiate a TLS session>
11 C & S: <check result of negotiation>
12 C: EHLO client.example.net
13 S: 250-server.example.com
14 S: 250-CID
 S: 250-AUTH PLAIN
16 C: CID MAC fe:45:gj:ha:i6:43:42:j9
17 S: 220 Go ahead
18 C: AUTH PLAIN dGVzdABOZXNOADEyMzQ=
19 S: 235 2.7.0 Authentication successful
—OR—
 S: 503 Unpermitted use of authentication In this example, after the connection between the client 102 and server 104 is established (line 1), the server 104 notifies the client 102 that it is ready for communication (line 2). The client 102 greets the server 104 using EHLO (line 3) and the server responds (line 4) and advertises that the server 104 is going to request and verify a CID before any login is successful (line 5). The client 102 and server 104 then negotiate a TLS session (lines 4 to 11) for subsequent encrypted plaintext communication. Using the encryption that the TLS session affords, the client 102 issues another EHLO command (line 12) following which the server 104 advertises that it supports SMTP AUTH and again advertises that it supports using a CID (lines 12 to 15). The client 102 then sends the CID to the server 104 (line 16). In this example, the CID comprises a media access control ("MAC") address of the client's 102 network interface card. The server 104 acknowledges receipt of the CID without providing affirmation regarding whether the server 104 has verified the CID as authentic (line 17). The client 102 subsequently sends authentication credentials, which in this example are a hashed version of the user's username and password (line 18). If the server 104 is able to authenticate the CID and if the SMTP authentication credentials are correct, the server 104 instructs the client that the following which the server responds that the user exists, the password is correct, and access can be granted based on the credentials provided (line 19). Alternatively, if any one or more of the CID and authentication credentials are incorrect, the server 104 instructs the client that the login is unsuccessful (line 20). In certain different embodiments (not depicted), in the event the server 104 is presented with a CID it cannot verify, the server 104 tells the client 102 that the CID cannot be verified.

As noted above, at line 17 the server's 104 response to the client's 102 sending the CID ("Go ahead") does not reveal whether the server 104 has successfully authenticated the CID. In the event that any one or more of the CID, username, or password that the client 102 sends to the server 104 are incorrect, the client 102 at line 20 does not know which of the CID, username, and password were inaccurate. This may make it significantly more difficult for the client 102 to use a dictionary or brute force attack to gain access to the user's account.

In this example embodiment, the server 104 may have one or more policies regarding permissible CIDs. For example, the server 104 may have stored in a look-up table a specific list of permissible CIDs. Additionally or alternatively, the server 104 may have stored one or more permissible classes or types of CIDs; for example, a device-type restriction may be that all CIDs that are derived from an Apple™ iOS™ license are permissible as the server 104 may wish to permit only Apple™ iOS™ devices to log in. Additionally or alternatively, the server 104 may use a customer or user-type restriction by recognizing as valid only those CIDs derived from an e-mail address of a particular domain or when used in conjunction with a particular set of user credentials. Additionally or alternatively, the server 104 may enforce a policy that permits CIDs based on connection characteristics; for example, the server 104 may only recognize as valid those CIDs being used by devices located in a certain geographical region such as the United States. The server 104 may overlay any one or more of these policies with each other; for example, the server 104 may only recognize as valid a CID representative of an Apple™ iOS™ device that is connecting from the United States, or the server 104 may only recognize a CID representative of a particular user or that is used in conjunction with a particular user's credentials when the CID also indicates that the connection is originating from a particular device (e.g., that user's BlackBerry™ phone) or location (e.g., that user's office building).

In the present example embodiment, the server 104 requires the client 102 to provide a CID that the server 104 verifies as being authentic before permitting the client 102 to successfully log in to the server 104; in different embodiments (not depicted), while the server 104 may support using a CID, it may not require the client 102 to use the CID. Additionally or alternatively, when the server 104 supports the CID, if the client 102 does not submit a CID that the server 104 can verify the server 104 may grant the client 102 a first tier of access, with a second and more expansive tier of access available to the client 102 only if the server 104 is able to verify the CID.

Additionally, in this example embodiment the CID comprises the client's MAC address; in different embodiments, the CID may additionally or alternatively comprise a software license identifier (e.g., a product key for a piece of software), the user's phone number or other information from the user's SIM card, a stored device identifier (e.g., a device serial number), a car vehicle identification number, a hardware encryption key, a particular software version, a personal identification number issued specifically for use as the CID, a digital representation of a user's biometric identifier (e.g., fingerprint or voiceprint), a user's birthday, and more generally any identifier that uniquely or non-uniquely (e.g., for a CID that identifies a class of devices or a geographical area) identifies one or both of the client 102 and the person or entity using the client 102. An example CID that identifies the client 102 and does not directly identify the person using the client 102 is the client's 102 MAC address and a software product key. Example CIDs that directly identify the person using the client 102 as opposed to the client 102 is information from that person's SIM card and a personal identification number for that person. In one embodiment, the server 104 may set policies based on how unique the CID is; for example, a CID representative of a particular type of device (e.g., a Microsoft™ Surface™ computer) may be treated with less trust that a CID representative of an individual (e.g., a biometric representation of a fingerprint). In this embodiment, the server 104 may be set to more quickly conclude that a device represents one of the attackers 108 more quickly if it is using the device-representative CID as opposed to the individual-representative CID when all other factors are equal.

Furthermore, while in this example embodiment the server 104 advertises for a CID and verifies the CID after receiving it, in different embodiments (not depicted) the server 104 may advertise for but not verify the CID after receiving it. In some of those different embodiments, the server 104 may at least require that the client present a CID before permitting the client 102 to successfully login, notwithstanding that the server 104 may not verify the CID that the client 102 presents.

Figure 2:
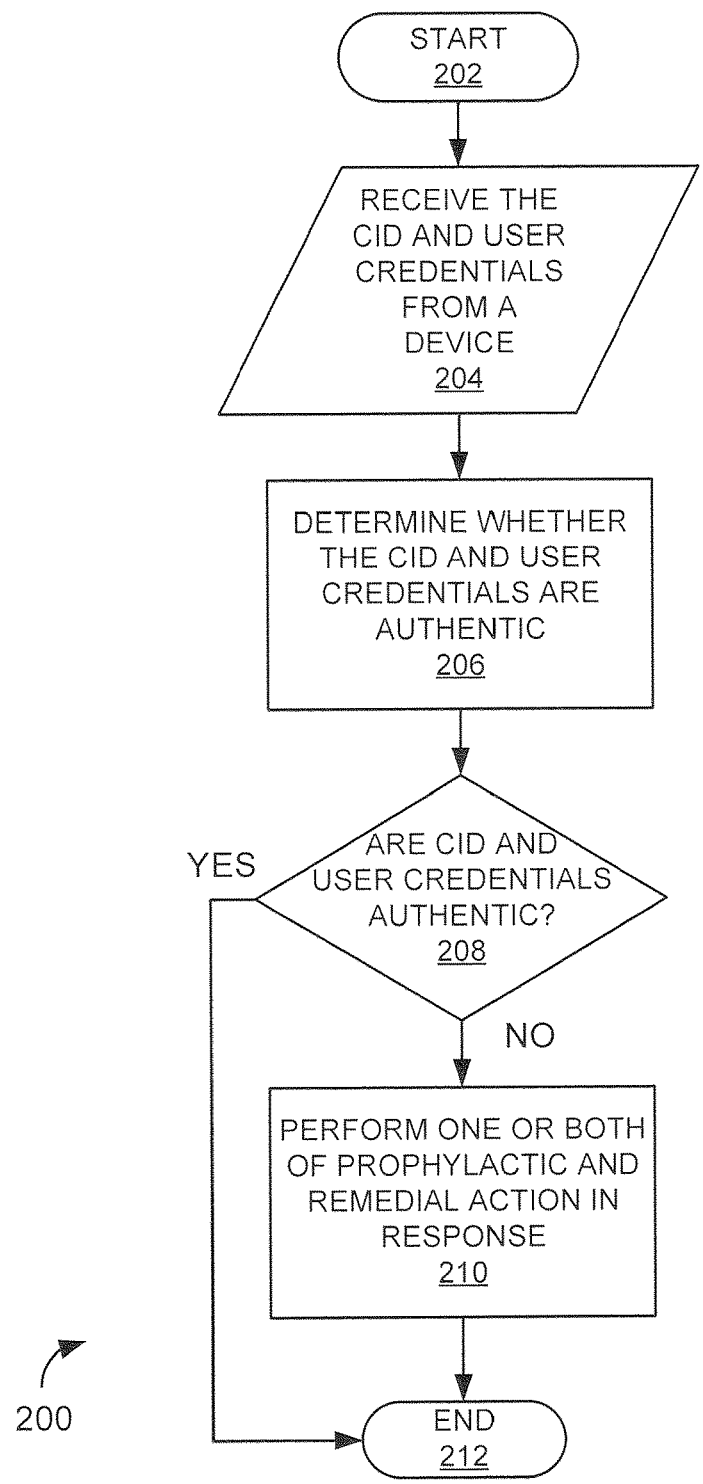
FIG. 2 is a method for network resource attack detection using a client identifier, according to another embodiment.

Examples 2 through 4, below, are particular examples of the example method 200 for network resource attack detection using a CID as shown in FIG. 2. In FIG. 2, the method 200 begins at block 202 and proceeds to block 204 where the server 104 receives the CID and user credentials from a device; the device may be one of the clients 102 in the event an authentic user is attempting to log in to the server 104 or one of the attackers 108. After receiving the CID and user credentials, it is determined whether the CID and credentials are authentic (block 206). If the CID and credentials are authentic, the method 200 ends (blocks 208 and 212). If one or both of the CID and credentials are inauthentic, it is determined that the device attempting to log in is one of the attackers 108 and one or both of prophylactic and remedial action is taken in response to this determination; examples of prophylactic and remedial action are provided in the following examples. In the embodiments below the server 104 performs blocks 206, 208, and 210, although in different embodiments (not depicted) a third party piece of computing equipment perform any one or more of those blocks.

Example 2

In this example, the interaction between the client 102 and the server 104 is identical to that of Example 1 with the exception that the client 102 does not submit any CID to the server 104. The server 104 is programmed to permit the client 102 to log in only after presentation of an authenticated CID and hashed username and password; consequently, the client's 102 AUTH attempt is refused without revealing the existence of one or both of the username and password and without revealing whether the login would have been successful but for presentation of an authentic CID. This results in the log file generated from communication between the client 102 and server 104 being identical to the log file of Example 1 with the exceptions that line 16 of the Example 1 log file is missing and that line 20 of the Example 1 log file is used instead of line 19.

The server 104 in this example is programmed to store information related to the attempted login; this information may comprise any one or more of the client's 102 IP address, geographical location (based, for example, on IP address), operating system type, rDNS/PTR records, network visible identifiers conveyed as part of the connection attempt (e.g., arguments passed with the SMTP HELO command), whether a connection without a CID was attempted notwithstanding the server's 104 policy to require a CID to connect, whether the same user-representative CID is being used from two different geological locations in a practically impossible manner (e.g., the same CID being used to log in from Moscow and New Delhi), whether the connection rate the device is attempting to connect at exceeds the rate possible by a human user, whether a discrepancy exists between information provided by the CID (e.g., that the device is running the Windows™ operating system) and information collected by other identifiers or means, whether the device is presenting a MAC address that is inappropriate for the device, passive operating system fingerprints, the number of network hops used to make the connection, whether the CID has been used for multiple devices attempting to connect when the CID is device unique such as a MAC address, and the same CID being used to multiple simultaneous connections when the user associated with the CID has only a single set of user credentials and is already logged in and when the CID is user unique such as a personal identification number. The server 104 may use this information and analogous or identical information from one or more of past, simultaneous, and future login attempts to identify a pattern to determine whether the communication attempts are from one or more of the attackers 108 as opposed to from a legitimate one of the clients 102. The information the server 104 uses to make that determination may be in respect of the same or different CIDs; IP addresses; geographical locations; usernames, passwords, or other authentication credentials; and any combination of the foregoing.

Once the server 104 has determined that one of the attackers 108 is attempting to login, the server 104 may take one or both of appropriate prophylactic and remedial action. This action may comprise any one or more of contacting appropriate authorities such as a system administrator, regulatory bodies, spam protection agencies, law enforcement or other government agencies, the American Registry for Internet Number, Internet Corporation for Assigned Names and Numbers, and the attackers' 108 upstream services provider; adding the IP address of the attacker 108 to a blacklist such as a Realtime Blackhole List; banning or restricting access of any one or more of the CID or other credentials (e.g., username or password) that the attacker 108 used to attempt to log in from being used in the future; refusing connections or logins from any one or more of the IP address, rDNS/PTR, and geographical location of the attacker 108; create a database of the attacker's 108 methods to facilitate identification of the structure of a botnet used for the attack, so as to gather evidence for legal purposes; and publish data on the attack (e.g., the IP from which the attack originates, and the networks are locations involved in carrying out the attack); informing other servers that are related to the server 104 of the attack, such as other servers in the same cluster as the server 104; allowing the attacker 108 to continue the attack to continue to gather more information about the attack and the attacker's 108 techniques; "hell banning" or "stealth banning" the attacker 108 so that the attacker 108 believes the attack is causing harm when it is, in fact, not; and tarpitting the attacker 108 to cause the attacker 108 to waste resources in committing an attack that is not harmful. "Refusing connections" may comprise any one or more of disconnecting the present connection and refusing further connection attempts from the attacker 108, which may be done by refusing future connections originating from any one or more of the attacker's 108 IP, geographical location, CID, and device identifier; and refusing future connections made or attempted to be made in a manner similar to those used by the attacker 108 (e.g., based on location of any attempted connections). Any refusal of future connections may be for an indefinite period, for a set period of time, or until the server 104 has contacted the authorized user of one or both of the CID and user credentials.

As another example, if the CID is unique to a device and not publicly accessible (e.g., based on a token stored on that device and transmitted only when encrypted, as with the encrypted TLS sessions in the examples herein) but nonetheless has been used by one of the attackers 108 in an attack, the server 104 may notify the user that the device used in the attack 108 has been compromised and that the device should therefore be one or more of destroyed, investigated, and cleaned.

In a different embodiment, instead of SMTP, a different communications protocol such as IMAP may use the CID to achieve the functionality described above. For example, the client 102 or attacker 108 may connect to port 993 of the server 104 to communicate using IMAP. Following the client 102 or attacker 108 submitting the CID, the server 104 checks to see if the CID is properly formatted; for example, if the server 104 is programmed to only accept CIDs that are MAC addresses, the server 104 may determine whether the received CID is formatted as a MAC address without substantively attempting to validate the CID. If the CID is in an unaccepted format, the server 104 treats the CID as invalid. If the CID is in an accepted format, the server 104 stores the CID temporarily in volatile memory and once the server 104 receives user credentials from the client 102 or attacker 108 (e.g., a hashed username and password), the server 104 performs a lookup of the stored CID against authentic CIDs that the server 104 has stored in association with those user credentials. If the server 104 finds the CID in its list of authentic CIDs, the CID is validated as being authentic and, if the user credentials are also validated, the login is allowed. If the server 104 does not find the CID in its list of authentic CIDs, the CID is not validated as authentic and the login is refused regardless of whether the presented user credentials are authentic. In a different embodiment (not depicted), the server 104 may permanently or temporarily store the CID in non-volatile memory when assessing validation. The server 104 may validate CIDs in non-IMAP embodiments in an analogous manner.

Example 3

In another example, a user may use one of the clients 102 to log in to the server 104 for the first time, with each of the client 102 and server 104 supporting use of the CID. The first time the client 102 and server 104 connect, the client 102 sends a CID to the server 104, and in one embodiment (not depicted) the client 102 sends additional information such as the client's 102 geographical location, IP address, network identifiers, and user identifiers to the server 104. In this example, the server 104 permanently stores the CID in non-volatile memory. The user may subsequently access the server 104 (e.g., via a customer portal) and activate a protection service that the server 104 offers and that leverages the CID; activation of this protection service results in all subsequent connections between the user and the server 104 requiring submission and validation of this initial CID. Subsequent attempts to log in using this approved CID together with approved user credentials will be permitted by the server 104; subsequent attempts using a different CID, which has not been approved, will not be permitted by the server 104, even if the other user credentials sent to the server 104 are correct. As in the above examples, if the CID is incorrect the server 104 does not inform the client whether it is a failure to validate the CID or the other user credentials that resulted in the failed login. Also as in the above examples, various types of specific action may be taken in response to a failed login because of an incorrect CID; for example, the source (e.g., IP address) of the client 102 attempting to log in may be black listed or otherwise labeled as being the IP address of one of the attackers 108. Additionally or alternatively, the server 104 may take action in response to various other types of information available to the server 104; for example, any user presenting the incorrect CID may be forbidden from logging into the server 104.

In one application of this functionality, the user is a worker who has a smartphone for business use (e.g., a BlackBerry™ phone) and a smartphone for personal use (e.g., an Android™ phone), and the user's CID is the MAC address of the business smartphone. In this example, regardless of whether SIM cards are switched between devices, the user will only be permitted to access mail via the server 104 if he or she accesses the server 104 using the business smartphone.

In different embodiments (not depicted), the server 104 may send an e-mail to an e-mail account of the user that the server 104 has on file after the user successfully logs in using the CID. In response to that e-mail (e.g., by clicking a link embedded in that e-mail), the user may be brought to a configuration page the permits the user to configure the policy implemented by the server 104 in respect of the CID. For example, the user may configure the server 104 to only permit access to the user's address book when the CID indicates the user is accessing the server 104 via a BlackBerry™ phone (e.g., the CID may be that phone's MAC address). Additionally or alternatively, the CID may represent an application on the user's phone or suite of devices (e.g., a product key indicative of the iOS™ operating system running across the user's iOS™ devices), and policy implementation may be based on this different CID.

Additionally or alternatively, the client 102 may self-register a CID with the server 104 after first successfully logging in using a particular set of user credentials in conjunction with a particular CID. For example, the CID may comprise a voiceprint and, at first login, the voiceprint may be registered as the CID to be used by the server 104 for validation purposes going forward. Subsequent successful logins may consequently require the client 102 to present the voiceprint to the server 104. Depending on the configuration of the client 102, this may comprise, for example, obtaining from the user of the client 102 a voice sample each time the user wants to log in to the server 104, and for each login attempt presenting that voice sample to the server 104. The server 104 may then compare the voice sample obtained for that particular login attempt to the voice sample recorded at first login and, if they match or sufficiently correspond, validate the voice sample for that particular login attempt as authentic and permit the login to continue, assuming the client 102 has also presented valid user credentials. In a different embodiment (not depicted), the self-registered CID may be presented at a login other than the first login; for example, the CID may be periodically reset, or the user may be able to log in to a portal that permits user configuration of the CIDs to be accepted as valid by the server 104.

In different embodiments (not depicted), multiple CIDs (e.g., with each CID corresponding to a different user device) may be associated with a single user.

In different embodiments (not depicted), the user may also log in to the server 104 through, for example, the customer portal and view a log showing attempts that have been made to log in using at least one of the user's CID and user credentials. The user may, for example, change which CIDs are authorized and unauthorized. For example, if the user accesses mail through any one of several smartphones that belong to the user's family and the CID for each of the smartphones is that phone's MAC address, the user may want all the phones' MAC addresses listed as authorized in order to be able to access mail from any family device. As another example, when the CID represents information on a smartphone's SIM card (e.g., the user's phone number), the user may want to be able to access the server 104 by swapping the SIM card across devices, regardless of the particular device being used.

Example 4

In this example, the server 104 is managed by an Internet Service Provider ("ISP") that applies various example methods to determine whether a person attempting to log in to the server 104 is an authentic user accessing the server 104 via one of the clients 102 or is one of the attackers 108.

In a first example method, the server 104 is programmed to only accept logins from the clients 102 that present authentic CIDs. The server 104 receives login attempts from a particular geographical location (e.g., a particular IP address, a particular rDNS/PTR, or a particular geographical area that maps to one or more particular IP addresses) that either does not present CIDs or that presents inaccurate CIDs. In one example, the login attempts repeatedly use one or more CIDs to attempt to log in to different user accounts. When applying the first example method, the server 104 determines whether the device attempting to log in has not presented a CID or has presented a CID that the server 104 is unable to verify (i.e., what is considered an inaccurate CID); determines the geographical area associated with that device; and bans or restricts access of all devices from within that geographical area. In one embodiment of the first example method, the server 104 may only ban or restrict access after receiving a certain threshold number of failed logins from that geographical area; the server 104 may accordingly track the number of failed logins from the geographical area and, when that number exceeds the threshold, then ban or restrict access of all devices from within that area. In another embodiment of the first example method, the server 104 may only ban or restrict access to those devices that have attempted to log in using an inaccurate CID. In another embodiment of the first example method, the server 104 may use two thresholds: the server 104 may ban or restrict access to those devices that have attempted to log in using an accurate CID according to a first threshold (e.g., a single failed login attempt) and may ban or restrict access to those remaining devices in the geographical area determined using those devices that have presented inaccurate CIDs according to a second threshold that is more generous (i.e., greater than) the first threshold.

In a second example method, instead of restricting or banning devices based on geographical area the server 104 restricts or bans based on device type. For example, after determining that one or more devices representing the attackers have attempted to log in, the server 104 may subsequently only allow a certain type of device to successfully log in. The CID may be the product key or another code indicative of BlackBerry™ operating system, for example, and the server 104 may only allow CIDs that are of this type to log in. The server 104 determines that devices that do not present BlackBerry™ CIDs are the attackers 108.

In a third example method, the server 104 determines that the same CID is being presented from multiple locations within a certain time period (e.g., simultaneously, or within a period short enough that it is very unlikely a legitimate user is using the CID). For example, the server 104 may receive login requests that use the same CID, which is associated with the MAC address of a desktop computer, that originate from IP addresses from several states within a period of one hour. The server 104 may consequently ban or restrict that CID from future logins. Additionally or alternatively, the server 104 may ban or restrict all future logins from the locations (e.g., IP addresses) from which that CID attempted to log in. As another example, the CID may be a device-type CID representative of a specific device, and there may be an increase of a certain number of logins over a certain time for that device (a "spike" in the number of logins) that that is practically unlikely (e.g., 5,000 new BlackBerry™ phone activations over the course of an hour), which the server 104 uses to determine that one or more of the attackers 108 is launching an attack.

In a fourth example method, the server 104 counts the number of times a login is attempted for which the CID and subsequent user credentials do not match. When this number exceeds a certain threshold, the server 104 may determine the geographical area associated with the devices that attempted to log in; and ban or restrict access of some or all of those devices from within their geographical areas. Additionally or alternatively, the server 104 may ban or restrict access for all devices attempting to log in using one or both of the CID and the user credentials of the failed login attempts.

More generally, the server 104 may determine whether a device attempting to log in to the server 104 is one of the attackers 108 by applying any suitable set of rules that are either globally defined and that apply to all devices attempting to log in to the server 104 or that are specific and apply to subsets of those devices based on any one or more characteristics such as device type, network resource type, operating system type, CID (e.g., whether the CID is representative of a particular device, class of devices, a particular user, or a class of users), user credentials (e.g., whether those user credentials identify a particular user or class of users), geographical location, rDNS/PTR, number of network hops the client 102 has made to establish a connection, whether network packets are encoded and the type of any encoding (e.g., whether encryption exists and, if so, method and version of encryption), source ports used for the connection, language identifiers, and similar criteria. Once the server 104 determines that one or more of the attackers 108 is attempting to log in by applying all or a subset of the rules, the server 104 then determines what action to take in response. This action again may be based, for example, on any one or more characteristics such as device type, network resource type, operating system type, CID (e.g., whether the CID is representative of a particular device, class of devices, a particular user, or a class of users), user credentials (e.g., whether those user credentials identify a particular user or class of users), geographical location, rDNS/PTR, number of network hops the client 102 has made to establish a connection, whether network packets are encoded and the type of any encoding (e.g., whether encryption exists and, if so, method and version of encryption), source ports used for the connection, language identifiers, and similar criteria.

The embodiments have been described above with reference to flowcharts and block diagrams of methods, apparatuses, systems, and computer program products. In this regard, the flowcharts and block diagrams in FIGS. 1 and 2 illustrate the architecture, functionality, and operation of possible implementations of various embodiments. For instance, each block of the flowcharts and block diagrams may represent a module, segment, or portion of code, which comprises one or more executable instructions for implementing the specified logical function(s). In some alternative embodiments, the functions noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the block diagrams and flowcharts, and combinations of those blocks, may be implemented by special purpose hardware-based systems that perform the specified functions or acts, or combinations of special purpose hardware and computer instructions.

Each block of the flowcharts and block diagrams and combinations thereof can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the blocks of the flowcharts and block diagrams.

These computer program instructions may also be stored in a computer readable medium that can direct a computer, other programmable data processing apparatus, or other devices to function in a particular manner, such that the instructions stored in the computer readable medium produce an article of manufacture including instructions that implement the function or act specified in the blocks of the flowcharts and block diagrams. The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions or acts specified in the blocks of the flowcharts and block diagrams.

Figure 3:
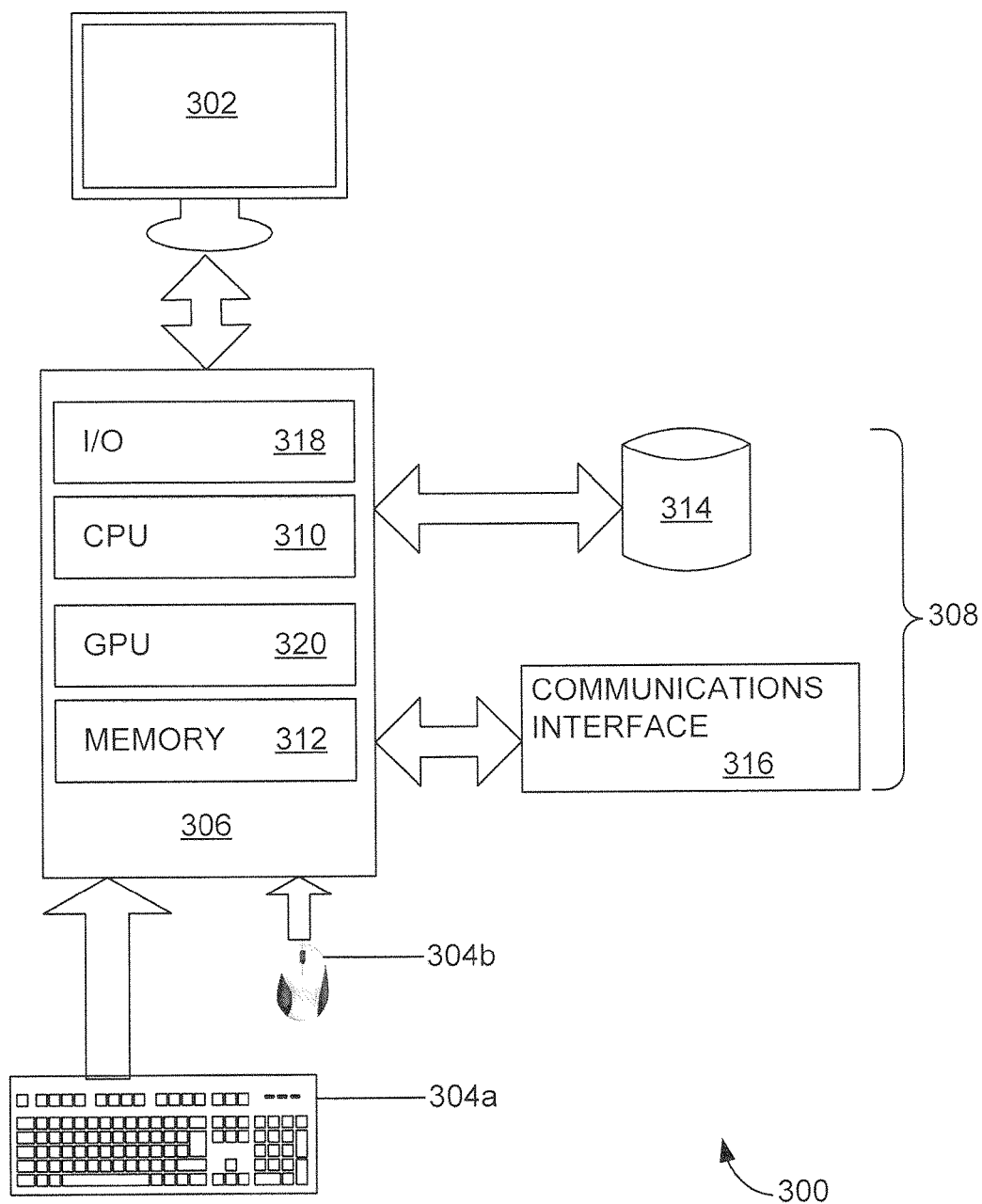
FIGS. 3 and 4 are examples of computers that can be used as components of the system of FIG. 1 and to perform the method of FIG. 2.

An illustrative computer system 300 in respect of which the methods herein described may be implemented is presented as a block diagram in FIG. 3. The computer system 300 may, for example, be used as the server 104, clients 102, attackers 108, or any combination thereof. The computer system 300 comprises a display 302, input devices in the form of keyboard 304a and pointing device 304b, computer 306, and external devices 308. While the pointing device 304b is depicted as a mouse, other types of pointing devices may also be used. In alternative embodiments (not depicted), the computer system 300 may not comprise all the components depicted in FIG. 3. For example, when used as the server 104, the computer system 300 may lack the display 302, keyboard 304a, and mouse 304b.

The computer 306 may comprise one or more processors or microprocessors, such as a central processing unit ("CPU") 310, which is depicted. The CPU 310 performs arithmetic calculations and control functions to execute software stored in an internal memory 312, such as one or both of random access memory ("RAM") and read only memory ("ROM"), and possibly additional memory 314. The additional memory 314 may comprise, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 314 may be physically internal to the computer 306, or external as shown in FIG. 3, or both.

The computer system 300 may also comprise other similar means for allowing computer programs or other instructions to be loaded. Such means can comprise, for example, a communications interface 316 that allows software and data to be transferred between the computer system 300 and external systems and networks. Examples of the communications interface 316 comprise a modem, a network interface such as an Ethernet card, a wireless communication interface, or a serial or parallel communications port. Software and data transferred via the communications interface 316 are in the form of signals which can be electronic, acoustic, electromagnetic, optical, or other signals capable of being received by the communications interface 316. Multiple interfaces, of course, can be provided on the computer system 300.

Input to and output from the computer 306 is administered by the input/output ("I/O") interface 318. The I/O interface 318 administers control of the display 302, keyboard 304a, external devices 308 and other analogous components of the computer system 300. The computer 306 also comprises a graphical processing unit ("GPU") 320. The GPU 320 may also be used for computational purposes as an adjunct to, or instead of, the CPU 310, for mathematical calculations. However, as mentioned above, in alternative embodiments (not depicted) the computer system 300 need not comprise all of these elements. For example, the server 104 may lack the display 302, keyboard 304a, mouse 304b, and GPU 320.

The various components of the computer system 300 are coupled to one another either directly or indirectly by shared coupling to one or more suitable buses.

Figure 4:
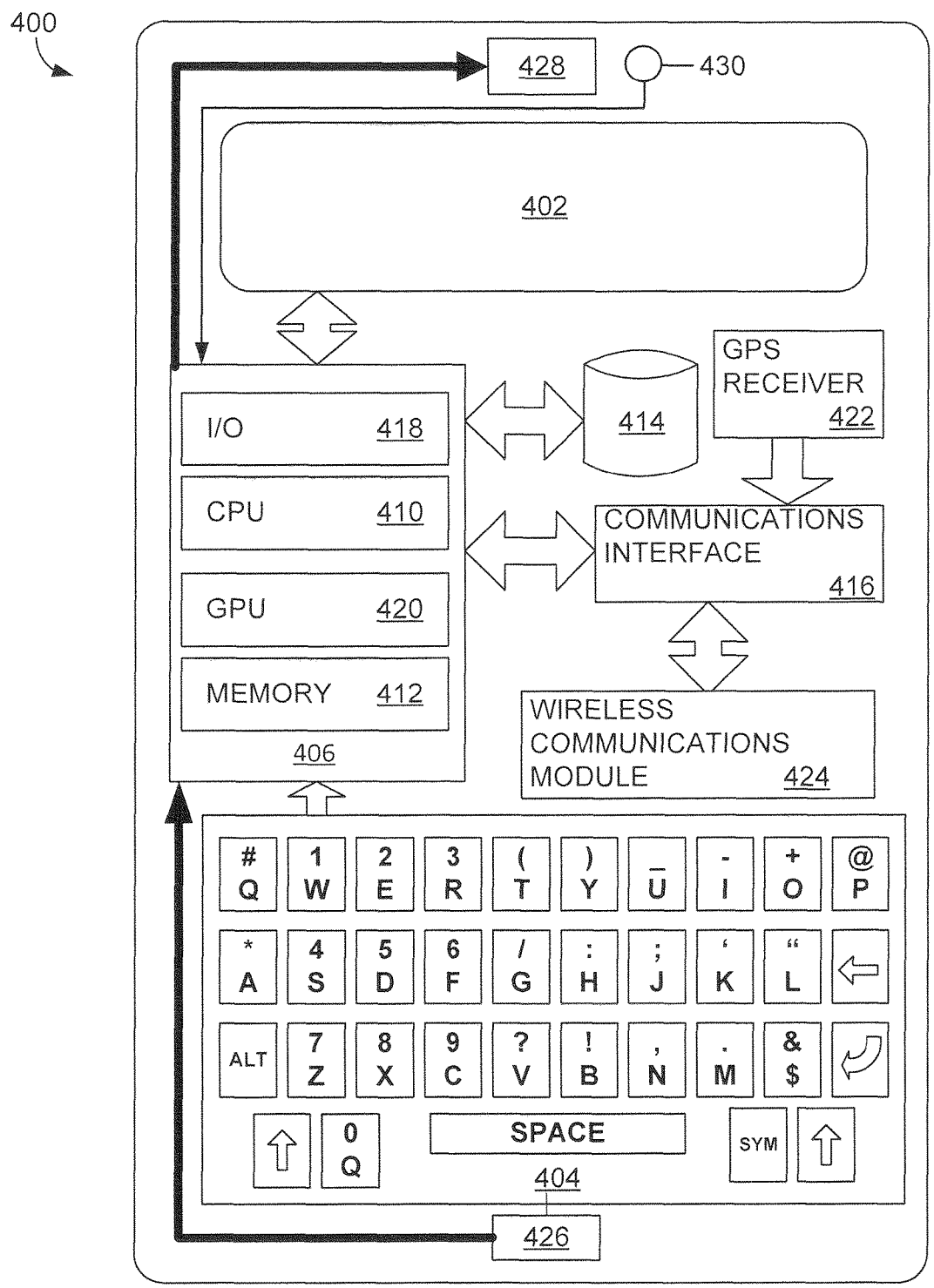

FIG. 4 shows an example networked mobile wireless telecommunication computing device in the form of the smartphone 400. The smartphone 400 may, for example, be used as the clients 102, the attackers 108, or both. The smartphone 400 comprises a display 402, an input device in the form of keyboard 404, and an onboard computer system 406. The display 402 may be a touchscreen display and thereby serve as an additional input device, or as an alternative to the keyboard 404. The onboard computer system 406 comprises a CPU 410 having one or more processors or microprocessors for performing arithmetic calculations and control functions to execute software stored in an internal memory 412, such as one or both of RAM and ROM, is coupled to additional memory 414 that typically comprises flash memory, which may be integrated into the smartphone 400 or may comprise a removable flash card, or both. The smartphone 400 also comprises wireless communication circuitry that allows software and data to be transferred between the smartphone 400 and external systems and networks. In the example embodiment of FIG. 4, the wireless communication circuitry comprises one or more wireless communication modules 424 communicatively coupled to a communications interface 416, which for example comprises a wireless radio for connecting to one or more of a cellular network, a wireless digital network, and a WiFi™ network. The communications interface 416 also enables a wired connection of the smartphone 400 to an external computer system. A microphone 426 and speaker 428 are coupled to the onboard computer system 406 to support the telephone functions managed by the onboard computer system 406, and GPS receiver hardware 422 may also be coupled to the communications interface 416 to support navigation operations by the onboard computer system 406. The smartphone 400 also comprises a camera 430 communicative with the onboard computer system 406 for taking photos using the smartphone 400. Input to and output from the onboard computer system 1006 is administered by an I/O interface 418, which administers control of the display 402, keyboard 404, microphone 426, speaker 428, and camera 430. The onboard computer system 406 may also comprise a separate GPU 420. The various components are coupled to one another either directly or by shared coupling to one or more suitable buses.

The term "computer system", as used herein, is not limited to any particular type of computer system and encompasses servers, desktop computers, laptop computers, networked mobile wireless telecommunication computing devices such as smartphones, tablet computers, as well as other types of computer systems.

As will be appreciated by one skilled in the art, embodiments of the technology described herein may be embodied as a system, method, or computer program product. Accordingly, these embodiments may take the form of an entirely hardware embodiment, an entirely software embodiment (including firmware, resident software, micro-code, etc.) or an embodiment combining software and hardware that may all generally be referred to herein as a "circuit," "module," or "system." Furthermore, embodiments of the presently described technology may take the form of a computer program product embodied in one or more non-transitory computer readable media having stored or encoded thereon computer readable program code.

Where aspects of the technology described herein are implemented as a computer program product, any combination of one or more computer readable media may be utilized. A computer readable medium may comprise a computer readable signal medium or a non-transitory computer readable medium used for storage. A non-transitory computer readable medium may comprise, for example, an electronic, magnetic, optical, electromagnetic, infrared, or semiconductor system, apparatus, or device, or any suitable combination thereof. Additional examples of non-transitory computer readable media comprise a portable computer diskette, a hard disk, RAM, ROM, an erasable programmable read-only memory ("EPROM" or "flash memory"), a portable compact disc read-only memory ("CD-ROM"), an optical storage device, a magnetic storage device, or any suitable combination thereof. As used herein, a non-transitory computer readable medium may comprise any tangible medium that can contain, store, or have encoded thereon a program for use by or in connection with an instruction execution system, apparatus, or device. Thus, computer readable program code for implementing aspects of the embodiments described herein may be contained, stored, or encoded on the memory 412 of the onboard computer system 406 of the smartphone 400 or the memory 312 of the computer 306, or on a computer readable medium external to the onboard computer system 406 of the smartphone 400 or the computer 306, or on any combination thereof; the onboard computer system 406 may thereby be configured to perform those embodiments.

A computer readable signal medium may comprise a propagated data signal with computer readable program code embodied therein, for example, in baseband or as part of a carrier wave. That propagated signal may take any of a variety of forms such as electro-magnetic, optical, or any suitable combination thereof. A computer readable signal medium may be any computer readable medium that is not a non-transitory computer readable medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination thereof. Computer program code for carrying out operations comprising part of the embodiments described herein may be written in any combination of one or more programming languages, including an object oriented programming language and procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (e.g., through the Internet using an Internet Service Provider).

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

It is contemplated that any part of any aspect or embodiment discussed in this specification can be implemented or combined with any part of any other aspect or embodiment discussed in this specification.

One or more currently example embodiments have been described by way of illustration only. This description is been presented for purposes of illustration and description, but is not intended to be exhaustive or limited to the form disclosed. Many modifications and variations will be apparent to those of ordinary skill in the art without departing from the scope of the claims. It will be apparent to persons skilled in the art that a number of variations and modifications can be made without departing from the scope of the claims. In construing the claims, it is to be understood that the use of a computer to implement the embodiments described herein is essential at least where the presence or use of computer equipment is positively recited in the claims.

The invention claimed is:

1. A method for network resource attack detection using a client identifier, the method comprising:
   (a) receiving, at a server, the client identifier and user credentials from a device, wherein the user credentials comprise a user identifier and password;
   (b) determining whether the client identifier and user credentials are authentic, wherein the device does not learn from the server which of the client identifier and user credentials are inauthentic when one or both of the client identifier and user credentials are determined to be inauthentic;
   (c) when at least one of the client identifier and user credentials are inauthentic, determining whether the device is an attacker of the network resource; and
   (d) performing one or both of prophylactic and remedial action in response to determining that the device is an attacker.

2. The method of claim 1 wherein the client identifier is representative of a class of devices.

3. The method of claim 1 wherein the client identifier is representative of a specific device.

4. The method of claim 1 wherein the client identifier is representative of a class of users.

5. The method of claim 1 wherein the client identifier is representative of a specific user.

6. The method of claim 1 wherein the client identifier is selected from the group comprising a MAC address of the device; a software license identifier; information stored on a SIM card inserted in the device; a serial number of the device; a car vehicle identification number; a hardware encryption key; a version of software; a personal identification number; a digital representation of a biometric identifier of the user; and a birthday of the user.

7. The method of claim 1 wherein the action is selected from the group comprising contacting authorities; adding the IP address of the device to a blacklist;
   banning or restricting access of the client identifier; banning or restricting access of the user credentials; refusing connections or login from any one or more of the IP address, rDNS/PTR, and geographical location of the device; creating a database of methods used by the device to connect to the server; publishing data regarding the connection from the device, stealth banning the device; and tarpitting the device.

8. A system for network attack detection using a client identifier, the system comprising:
   (a) ports for communication with devices comprising clients and attackers;
   (b) a processor communicatively coupled to the ports; and
   (c) a non-transitory computer readable medium communicatively coupled to the processor, the medium having computer program code stored thereon that is executable by the processor and that, when executed by the processor, causes the processor to:
      (i) receive the client identifier and user credentials from a device, wherein the user credentials comprise a user identifier and password;
      (ii) determine whether the client identifier and user credentials are authentic, wherein the device does not learn from the system which of the client identifier and user credentials are inauthentic when one or both of the client identifier and user credentials are determined to be inauthentic;
      (iii) when at least one of the client identifier and user credentials are inauthentic, determining whether the device is an attacker of the network resource; and
      (iv) performing one or both of prophylactic and remedial action in response to determining that the device is an attacker.

9. The system of claim 8 wherein the client identifier is representative of a class of devices.

10. The system of claim 8 wherein the client identifier is representative of a specific device.

11. The system of claim 8 wherein the client identifier is representative of a class of users.

12. The system of claim 8 wherein the client identifier is representative of a specific user.

13. The system of claim 8 wherein the client identifier is selected from the group comprising a MAC address of the device; a software license identifier; information stored on a SIM card inserted in the device; a serial number of the device; a car vehicle identification number; a hardware encryption key; a version of software; a personal identification number; a digital representation of a biometric identifier of the user; and a birthday of the user.

14. The system of claim 8 wherein the action is selected from the group comprising contacting authorities; adding the IP address of the device to a blacklist; banning or restricting access of the client identifier; banning or restricting access of the user credentials; refusing connections or logins from any one or more of the IP address, rDNS/PTR, and geographical location of the device; creating a database of methods used by the device to connect to the server; publishing data regarding the connection from the device, stealth banning the device; and tarpitting the device.

15. A non-transitory computer readable medium having program code stored thereon that is executable by a processor comprising part of a server and that, when executed by the processor, causes the processor to:
   (a) receive the client identifier and user credentials from a device, wherein the user credentials comprise a user identifier and password;
   (b) determine whether the client identifier and user credentials are authentic, wherein the device does not learn from the server which of the client identifier and user credentials are inauthentic when one or both of the client identifier and user credentials are determined to be inauthentic;
   (c) when at least one of the client identifier and user credentials are inauthentic, determining whether the device is an attacker of the network resource; and
   (d) performing one or both of prophylactic and remedial action in response to determining that the device is an attacker.

16. The non-transitory computer readable medium of claim 15 wherein the client identifier is representative of a class of devices.

17. The non-transitory computer readable medium of claim 15 wherein the client identifier is representative of a specific device.

18. The non-transitory computer readable medium of claim 15 wherein the client identifier is representative of a class of users.

19. The non-transitory computer readable medium of claim 15 wherein the client identifier is representative of a specific user.

20. The non-transitory computer readable medium of claim 15 wherein the client identifier is selected from the group comprising a MAC address of the device; a software license identifier; information stored on a SIM card inserted in the device; a serial number of the device; a car vehicle identification number; a hardware encryption key; a version of software; a personal identification number; a digital representation of a biometric identifier of the user; and a birthday of the user.

* * * * *